US008712744B1

(12) United States Patent
Sampigethaya et al.

(10) Patent No.: US 8,712,744 B1
(45) Date of Patent: Apr. 29, 2014

(54) SIMULATION TOOL FOR AIR TRAFFIC COMMUNICATIONS SECURITY

(75) Inventors: Radhakrishna G. Sampigethaya, Snoqualmie, WA (US); Radha Poovendran, Seattle, WA (US)

(73) Assignee: The Boeing Company, Chicago, IL (US)

( * ) Notice: Subject to any disclaimer, the term of this patent is extended or adjusted under 35 U.S.C. 154(b) by 179 days.

(21) Appl. No.: 13/106,348

(22) Filed: May 12, 2011

Related U.S. Application Data

(60) Provisional application No. 61/389,074, filed on Oct. 1, 2010.

(51) Int. Cl.
*G06F 17/00* (2006.01)

(52) U.S. Cl.
USPC .......... 703/6; 701/3; 701/14; 701/15; 701/16; 701/120; 701/121; 701/122

(58) Field of Classification Search
None
See application file for complete search history.

(56) References Cited

U.S. PATENT DOCUMENTS 7,702,427 B1 * 4/2010 Sridhar et al. .................... 701/4
2011/0057830 A1 3/2011 Sampigethaya et al.

OTHER PUBLICATIONS

Mackley et al., "Imposing Communications Network Effects Into a Real-Time Simulation Environment", AIAA Modeling and Simulation Technologies Conference and Exhibit, Aug. 21-24, 2006, Keystone, Colorado.*

Cui et al., Network Security Simulation and Evaluation, CSTST 2008, Oct. 27-31, 2008, Cergy-Pontoise, France, Copyright 2008 ACM, pp. 55-58.*

Gariel et al., Graceful Degradation of Air Traffic Operations: Airspace Sensitivity to Degraded Surveillance Systems, Proceedings of the IEEE, vol. 96, No. 12, Dec. 2008, pp. 2028-2039.*

Sweet et al., Fast-Time Simulation System for Analysis of Advanced Air Transportation Concepts, AIAA Modeling and Simulation Technologies Conference and Exhibit, Aug. 5-8, 2002.*

Williams et al., System Wide Modeling in Fast-time Simulation: Current and Future Capabilities, 7th AIAA Aviation Technology, Integration and Operations Conference, Sep. 18-20, 2007.*

"FACET—Future ATM Concepts Evaluation Tool", Advanced Air Transportation Technologies, 1 page, retrieved Apr. 8, 2011 http://as.nasa.gov/aatt/facet.html.

"FAA/Eurocontrol Cooperative R&D Action Plan 9, System Wide Modeling in Fast-time Simulation Current and Future Capabilities", pp. 1-66, Sep. 2007 http://catsr.ite.gmu.edu/NASWideSim/AP9_System_Wide_Modeling_final.pdf.

"Airport Capacity and NAS-Wide Delay Benefits Assessment of Near-Term Operational Concepts" AIAA 2006-7720, American Institute of Aeronautics and Astronautics, 6th AIAA Aviation Technology, Integration and Operations Conference (ATIO) Sep. 2006, Wichita Kansas, 1 page http://pdf.aiaa.org/preview/CDReadyMATIO06_1322/PV2006_7720.pdf.

Sampigethaya et al., "Visualization and Assessment of ADS-B Security for Green ATM", Oct. 5, 2010, IEEE/AIAA Digital Avionics Systems Conference 2010, pp. 1-16.

* cited by examiner

*Primary Examiner* — Kandasamy Thangavelu
*Assistant Examiner* — Michael P Healey
(74) *Attorney, Agent, or Firm* — Yee & Associates, P.C.

(57) ABSTRACT

A method and apparatus for simulating effects of threats to aircraft communications. A simulation of an aircraft environment is run with the aircraft communications in an aircraft communications network in the aircraft environment. A number of conditions is introduced. The number of conditions comprises a threat configured to affect the aircraft communications in the aircraft communications network in an undesired manner. A change in traffic flow of aircraft in an airspace in the aircraft environment is identified in response to the number of conditions.

20 Claims, 9 Drawing Sheets

SIMULATION TOOL FOR AIR TRAFFIC COMMUNICATIONS SECURITY

RELATED PROVISIONAL APPLICATION

This application is related to and claims the benefit of priority of provisional U.S. Patent Application Ser. No. 61/389,074 filed Oct. 1, 2010, entitled "Simulation Tool for Air Traffic Communications Security", which is incorporated herein by reference.

BACKGROUND INFORMATION

1. Field

The present disclosure relates generally to aircraft and, in particular, to aircraft communications. Still more particularly, the present disclosure relates to a method and apparatus for assessing threats to aircraft communications.

2. Background

Currently, air traffic management (ATM) systems face challenges in meeting the demands of future aviation needs and requirements. Traffic is predicted to increase in at least volume, frequency, density, and complexity for both airborne and on-ground operations. At the same time, airspace stakeholders are expecting higher efficiency, flexibility, predictability, and increased safety.

Aircraft will rely on aircraft-to-ground and aircraft-to-aircraft communications enabled by the new automatic dependent surveillance-broadcast (ADS-B) technology to navigate in airspaces in the presence of uncertainties that emanate from both natural and malicious disruptions. Before wide-scale deployment of automatic dependent surveillance-broadcast technology, it would have been advantageous to identify and ensure that the impact of such disruptions can be addressed satisfactorily.

At present, however, a lack of understanding is present as to how automatic dependent surveillance-broadcast and its vulnerabilities can impact air traffic management systems and what undesirable conditions they can induce, thus impeding its beneficial applications. Although automatic dependent surveillance-broadcast is being deployed at airports and airspace systems, partly because of the lack of security assessments of vulnerabilities, the applications being considered are mostly focused on the automatic dependent surveillance-broadcast out mode. In the out mode, only the aircraft-to-ground communications enabled by automatic dependent surveillance-broadcast are used for air traffic management.

For example, the use of shared datalinks in automatic dependent surveillance-broadcast introduces opportunities for malicious exploitation of vulnerabilities in the air traffic management (ATM) system that must be assessed and mitigated. Undesirable conditions from natural disruptions in an automatic dependent surveillance-broadcast datalink can potentially cause the air traffic management system to degrade in accuracy and performance. The natural disruptions include, for example, weather and radio interference. The malicious disruptions include, for example, data corruption, spoofing, and wireless jamming.

Furthermore, while the effects of wireless jamming are well covered by a safety analysis and mitigated by gracefully degrading to a backup non-global navigation satellite system based surveillance, the risks from "intelligent" jamming, such as selective disruption of air traffic flows in the National Airspace System (NAS), also are concerns.

Therefore, it would be advantageous to have a method and apparatus that take into account at least some of the issues discussed above, as well as possibly other issues.

SUMMARY

In one advantageous embodiment, a method for simulating effects of threats to aircraft communications is provided. A simulation of an aircraft environment is run with the aircraft communications in an aircraft communications network in the aircraft environment. A number of conditions is introduced. The number of conditions comprises a threat configured to affect the aircraft communications in the aircraft communications network in an undesired manner. A change in traffic flow of aircraft in an airspace in the aircraft environment is identified in response to the number of conditions.

In another advantageous embodiment, a method for simulating communications disruptions in an aircraft environment is provided. A simulation of the aircraft environment is run. Input conditions are introduced to the simulation comprising at least one threat and at least one solution to reduce at least one of the at least one threat and effects of the at least one threat. Changes to a number of performance metrics caused by the input conditions are identified. A result of the at least one threat and the at least one solution is displayed in the simulation with respect to the movement of aircraft in an airspace in the aircraft environment on a display system.

In yet another advantageous embodiment, an apparatus comprises a computer system. The computer system is configured to run a simulation of an aircraft environment with aircraft communications. The computer system is further configured to introduce a number of conditions. The number of conditions comprises a threat configured to affect the aircraft communications in an aircraft communications network in an undesired manner. The computer system is configured to identify a change in a traffic flow of aircraft in an airspace in the aircraft environment in response to the number of conditions.

The features, functions, and advantages can be achieved independently in various advantageous embodiments of the present disclosure or may be combined in yet other advantageous embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood with reference to the following detailed description of an advantageous embodiment of the present disclosure when read in conjunction with the accompanying drawings, wherein:

DETAILED DESCRIPTION

The different advantageous embodiments recognize and take into account a number of different considerations. As used herein, "a number of", when used with reference to items, means "one or more items." As an example, "a number of different considerations" is "one or more considerations." The different advantageous embodiments recognize and take into account that understanding and evaluating the effects of interferences with air traffic management systems need to be identified and evaluated.

In particular, the different advantageous embodiments recognize and take into account that it would be desirable to understand and evaluate vulnerabilities of the air traffic management system in response to natural and/or malicious conditions.

The different advantageous embodiments also recognize and take into account that identifying solutions and implementing steps to mitigate any effects of these types of conditions may also be desirable. The different advantageous embodiments recognize and take into account that effects on communications between aircraft and an aircraft communications network may affect the flow of aircraft within an airspace.

Thus, the different advantageous embodiments provide a method and apparatus for simulating threats to aircraft communications. Additionally, the different advantageous embodiments also provide a method and apparatus for evaluating the threats and identifying potential solutions to the threats.

In one advantageous embodiment, a method is present for simulating effects of threats to aircraft communications. A simulation of an aircraft environment with aircraft communications is run. A number of conditions is introduced. The number of conditions includes a threat configured to affect the aircraft communications and the aircraft communications network in an undesired manner. A change in a traffic flow of the aircraft in an airspace in the aircraft environment is identified in response to a number of conditions.

Figure 1:
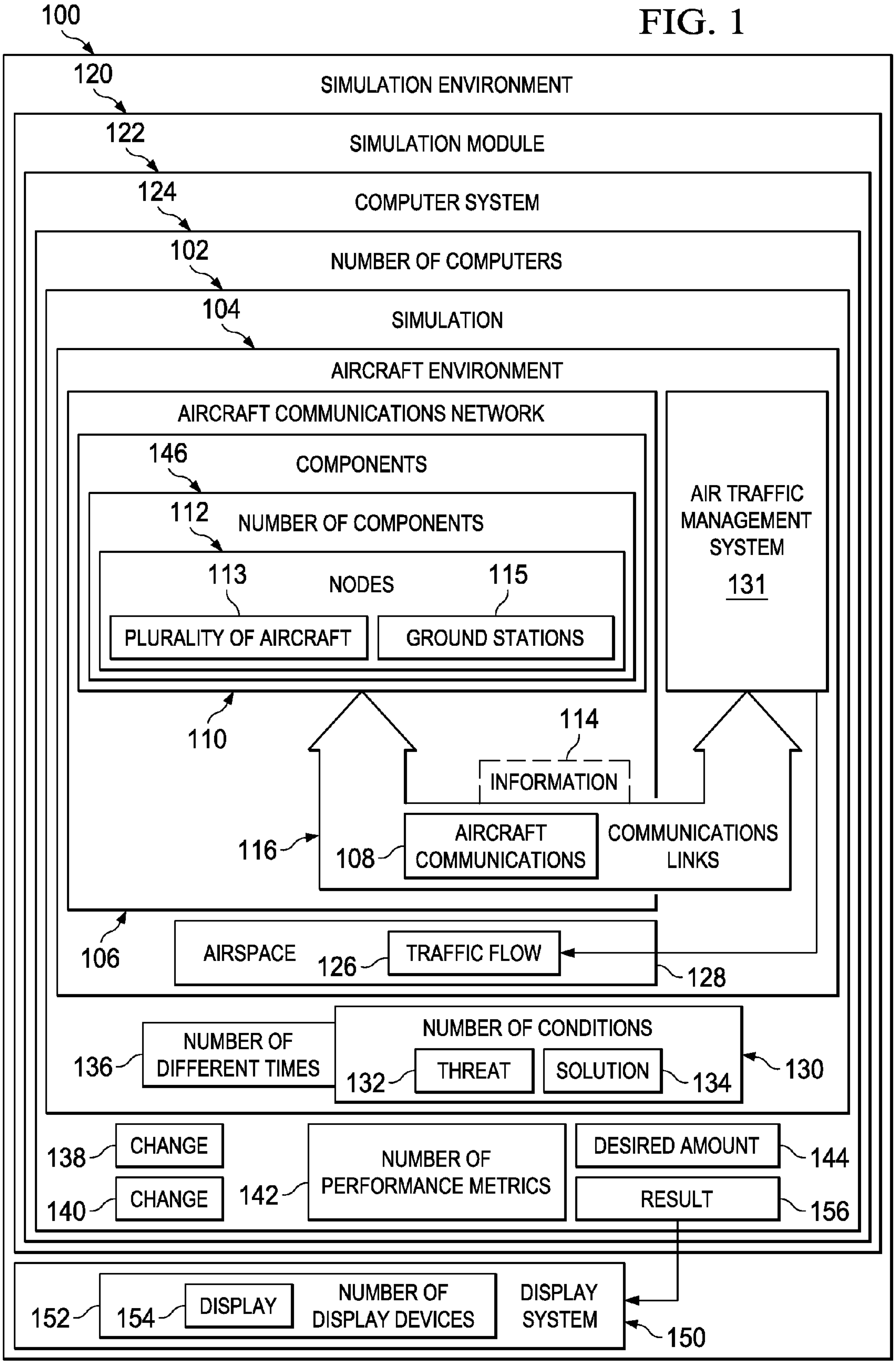
FIG. 1 is an illustration of a simulation environment in accordance with an advantageous embodiment.

With reference now to FIG. 1, an illustration of a simulation environment is depicted in accordance with an advantageous embodiment. In these illustrative examples, simulation environment 100 is an environment in which simulation 102 of aircraft environment 104 is run. Aircraft environment 104 in simulation 102 is a simulated or abstract model of a real aircraft environment.

As illustrated, simulation 102 of aircraft environment 104 includes aircraft communications network 106 in which aircraft communications 108 occur. Aircraft communications network 106 includes components 110 that facilitate in aircraft communications 108.

In these illustrative examples, a component in components 110 may be selected from at least one of an aircraft, a vehicle, a ground station, a communications network within aircraft communications network 106, a communications link, a satellite, an airspace sector, a region of airspace, and/or other suitable types of components within aircraft communications network 106. The vehicle may be, for example, an unmanned aerial vehicle, a helicopter, a ground vehicle, an amphibious vehicle, a water vehicle, or some other suitable type of vehicle. The ground station may take the form of, for example, without limitation, a control tower, a radar communications station, a multilateration communications station, a data communications station, an airport, and/or some other suitable type of platform on the ground. In these examples, an airspace sector is a portion of a region of airspace 128. For example, one or more airspace sectors may form a region of airspace 128.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example may also include item A, item B, and item C, or item B and item C. In other examples, "at least one of" may be, for example, without limitation, two of item A, one of item B, and 10 of item C; four of item B and seven of item C; and other suitable combinations.

Further, in these illustrative examples, at least a portion of components 110 form nodes 112 in aircraft communications network 106. A node in nodes 112 may be any type of vehicle, ground station, or other type of platform in components 110 in aircraft communications network 106 configured to send and/or receive information 114 using aircraft communications 108 in aircraft communications network 106. For example, nodes 112 may include plurality of aircraft 113 and ground stations 115.

In these illustrative examples, information 114 exchanged in aircraft communications 108 may include, for example, without limitation, voice data, commands, programs, messages, notice to airmen, weather information, wind shear warnings, position information, and/or other suitable information. In one illustrative example, aircraft communications 108 may be enabled using automatic dependent surveillance-broadcast (ADS-B) technology and/or other suitable types of technologies.

With automatic dependent surveillance-broadcast technology, a node in nodes 112 automatically sends information 114 identified using a global positioning system to one or more other nodes in nodes 112. For example, an aircraft in nodes 112 may send information 114 identified using a global positioning system to other aircraft near the aircraft and an airport. This information may include, for example, a current position, a velocity, an altitude, an identification, other types of information identified using a global positioning system, and/or other suitable information for the aircraft.

In these illustrative examples, aircraft communications 108 between nodes 112 may be provided using communications links 116 in aircraft communications network 106. Communications links 116 may include wireless communications links, wired communications links, optical communications links, and/or other suitable types of communications links in these illustrative examples.

In these depicted examples, simulation 102 of aircraft environment 104 is run by simulation module 120. Simulation module 120 may be implemented using hardware, software, or a combination of the two. In one illustrative example, simulation module 120 may be implemented in computer system 122. Computer system 122 includes number of computers 124.

In these illustrative examples, simulation 102 of aircraft environment 104 run by simulation module 120 is a simulation of the management of traffic flow 126 of plurality of aircraft 113 in airspace 128 in aircraft environment 104. In particular, simulation 102 simulates air traffic management (ATM) system 131 managing traffic flow 126 of plurality of aircraft 113 in airspace 128 in aircraft environment 104 using information 114 provided through aircraft communications 108. Traffic flow 126 of plurality of aircraft 113 is how the different aircraft in plurality of aircraft 113 fly in aircraft environment 104.

In these illustrative examples, simulation module 120 identifies changes to traffic flow 126 that may occur in response to undesired changes in aircraft communications 108. These changes may include, for example, crowding of airspace in aircraft environment 104, flight delays, flight cancellations, changes to flight paths for aircraft, rerouting of aircraft, and/or other types of changes.

For example, number of conditions 130 may be introduced into simulation 102. Number of conditions 130 may also be referred to as a number of input conditions. Number of conditions 130 may be introduced in a number of different ways. For example, number of conditions 130 may be introduced by user input, program code running in simulation module 120, or in some other suitable manner.

In these illustrative examples, number of conditions 130 may include, for example, threat 132. Threat 132 is any condition that may affect aircraft communications 108 in an undesired and/or unexpected manner. For example, threat 132 may comprise at least one of false information introduced into aircraft communications network 106, an interruption of aircraft communications 108, a reduction in speed of aircraft communications 108, and/or some other undesired and/or unexpected effect on aircraft communications 108. False information may include, for example, false voice data, false commands, false messages, invalid data, false notices to airmen, invalid weather information, and/or other suitable types of false information. In some illustrative examples, threat 132 may be a cyber-physical system threat or vulnerability exploit in aircraft communications network 106.

In other illustrative examples, threat 132 may be selected from at least one of, for example, a solar flare, an environmental condition, a weather condition, a virus on a computer system in aircraft communications network 106, a device in aircraft communications network 106 configured to intentionally disrupt aircraft communications 108, a device in aircraft communications network 106 configured to introduce false information into aircraft communications network 106, or some other type of threat.

In some cases, number of conditions 130 may also include solution 134. Solution 134 is any condition that may reduce threat 132 to aircraft communications 108 and/or reduce the effects of threat 132 on aircraft communications 108. In other words, solution 134 may be a condition that is configured to mitigate the effects of threat 132. In some cases, reducing threat 132 and/or the effects of threat 132 may include eliminating threat 132 and/or reversing any effects of threat 132 on aircraft communications 108, air traffic management system 131, and aircraft environment 104.

In these illustrative examples, solution 134 may comprise at least one of a vulnerability mitigation, a system response to a detected vulnerability exploit, an anti-virus program, and/or other suitable solutions. A vulnerability mitigation may include, for example, at least one of rerouting an aircraft, rescheduling of take-offs and landings for at least one airport, relying on radar systems more than a global positioning system, and/or some other suitable method for reducing a vulnerability in aircraft communications 108 that has been detected or exploited.

As more specific examples, solution 134 may comprise at least one of a radar based position verification, a multilateration based position verification, a cryptography based message verification, and other suitable types of solutions for threats.

Number of conditions 130 may be introduced into simulation 102 at number of different times 136 for simulation 102. Number of different times 136 may include, for example, before simulation 102 is run, while simulation 102 is running, and/or other times.

For example, threat 132 may be introduced into simulation 102 before simulation 102 is run. Simulation module 120 identifies disruptions to aircraft communications 108 based on the introduction of threat 132 into simulation 102. Further, simulation module 120 identifies change 138 in traffic flow 126 in airspace 128 in aircraft environment 104 in response to these disruptions to aircraft communications 108.

Additionally, solution 134 is introduced into simulation 102 at a later point in time, while simulation 102 is running. Simulation module 120 identifies any reductions in the disruptions to aircraft communications 108 based on the introduction of solution 134 for threat 132 into simulation 102. Further, simulation module 120 identifies change 140 in traffic flow 126 in airspace 128 in response to any identified reductions in the disruptions to aircraft communications 108.

In these illustrative examples, change 138 and change 140 may be quantified in number of performance metrics 142 for traffic flow 126. A metric in number of performance metrics 142 is a standard of measurement. Number of performance metrics 142 measures different parameters for traffic flow 126. In particular, the parameters for traffic flow 126 may include parameters that may change based on changes to aircraft communications 108. These parameters may be identified and/or defined by user input in some illustrative examples.

For example, number of performance metrics 142 may include at least one of a number of airspace sectors disrupted, a number of airports disrupted, a number of aircraft disrupted, a number of flights delayed, a number of aircraft rerouted, a number of flights cancelled, a number of aircraft in a particular airspace sector, and/or other suitable types of performance metrics. Further, number of performance metrics 142 may include any number of metrics quantifying at least one of airspace capacity, airspace safety, aircraft energy usage, aircraft greenhouse gas emissions, aircraft noise, and other suitable types of performance metrics for measuring aircraft and air traffic management system performance.

In these illustrative examples, simulation module 120 may determine whether solution 134 reduces threat 132 and/or the effects of threat 132 by desired amount 144. This determination is made using change 138 in traffic flow 126 identified in response to threat 132 and change 140 in traffic flow 126 identified in response to solution 134. In some illustrative examples, simulation module 120 may determine that a revised or new solution to threat 132 is needed when solution 134 does not reduce threat 132 and/or the effects of threat 132 by desired amount 144.

Additionally, number of conditions 130 introduced into simulation 102 may include a number of threats, a number of solutions, and/or other input conditions in addition to or in place of threat 132 and/or solution 134. Simulation module 120 identifies number of components 146 in components 110 in aircraft communications network 106 affected by number of conditions 130.

As depicted, simulation module 120 is configured to display traffic flow 126 with any changes to traffic flow 126 caused by number of conditions 130 on display system 150. Display system 150 comprises number of display devices 152. Number of display devices 152 comprises hardware and may include, for example, a touch screen, a liquid crystal display (LCD) device, a monitor, and/or any other suitable type of display device.

In particular, simulation module 120 generates display 154 of traffic flow 126 and any changes to traffic flow 126 in response to number of conditions 130 to be displayed on display system 150. In these illustrative examples, display 154 includes a display of result 156 of simulation 102 after number of conditions 130 has been introduced into simulation 102. Result 156 may include, for example, an identification of change 138 in traffic flow 126, change 140 in traffic flow 126, a state of aircraft communications 108, and/or other suitable information.

In addition to or in place of traffic flow 126, display 154 may also include, for example, a graphical representation or graphical visualization of aircraft communications network 106. For example, display 154 may include at least one of nodes 112 in aircraft communications network 106, communications links 116 between nodes in nodes 112, flight paths, one or more of plurality of aircraft 113, one or more of components 110, a number of airports, airspace sectors, changes to communications links 116, changes to the flight paths, air traffic management infrastructures, and/or other suitable items of interest.

Display 154 allows an operator using simulation module 120 to make decisions regarding solutions for potential threats. For example, depending on result 156 of simulation 102 displayed on display system 150, an operator may revise solution 134 for threat 132. In some cases, depending on display 154, the operator may input a new condition to be considered in simulation 102, while simulation 102 is being run.

The illustration of simulation environment 100 in FIG. 1 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, simulation module 120 may be configured to simulate different types of air traffic management systems in addition to or in place of air traffic management system 131. With different types of air traffic management systems, result 156 for simulation 102 of aircraft environment 104 in response to number of conditions 130 may be different.

In other illustrative examples, threat 132 may be some other type of threat other than the types of threats that have been described. For example, in some cases, threat 132 may be the device of a passenger on an aircraft that has inadvertently been turned on. This device may cause interference that may disrupt aircraft communications 108. For example, the device in the on state may prevent communications with a global positioning system satellite.

Figure 2:
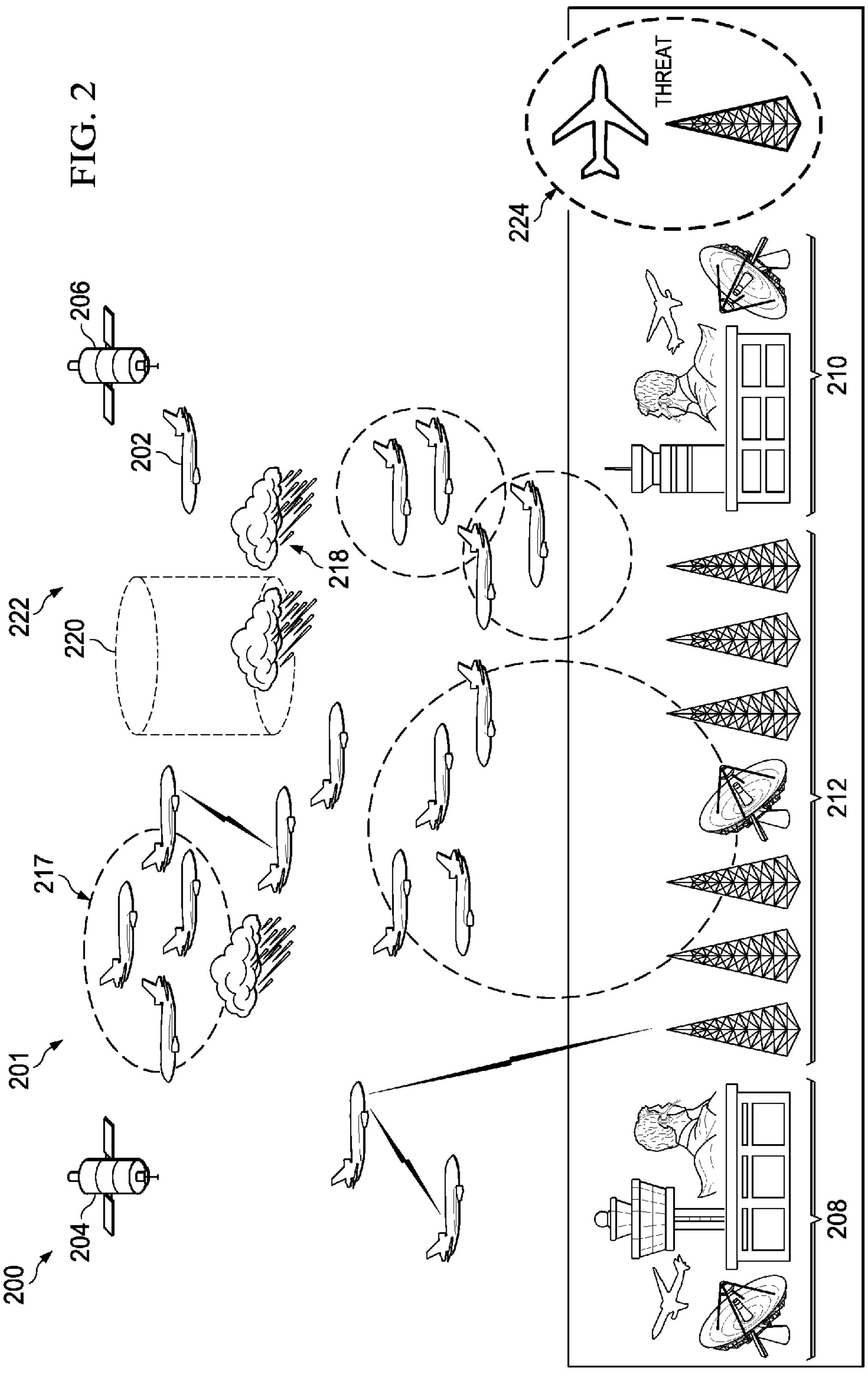
FIG. 2 is an illustration of an aircraft environment in accordance with an advantageous embodiment.

With reference now to FIG. 2, an illustration of an aircraft environment is depicted in accordance with an advantageous embodiment. In this illustrative example, aircraft environment 200 is an example of a real world physical aircraft environment that may be simulated using simulation module 120 in FIG. 1. In other words, simulation 102 of aircraft environment 104 run by simulation module 120 is a simulation of aircraft environment 200.

As depicted, aircraft environment 200 includes plurality of aircraft 202, satellite 204, satellite 206, airport 208, airport 210, and ground stations 212 that form aircraft communications network 201. Plurality of aircraft 202, satellite 204, satellite 206, airport 208, airport 210, and ground stations 212 may exchange information using wireless communications links in this illustrative example.

Communications may be enabled using various types of technologies. For example, communications in aircraft communications network 201 may use at least one of automatic dependent surveillance-broadcast technology, point-to-point based communications links, such as an Internet Protocol aeronautical network link, and/or other suitable types of communications technologies.

In one illustrative example, each aircraft in group of aircraft 217 uses automatic dependent surveillance-broadcast technology to send messages to each other and/or to one or more of ground stations 212. These messages may include, for example, a current position of an aircraft, a velocity of an aircraft, an altitude of an aircraft, and/or other suitable information about an aircraft.

In this illustrative example, an aircraft in plurality of aircraft 202 receives position information from satellite 204 and/or satellite 206. These satellites are global navigation system satellites that are part of a global positioning system in this depicted example.

As depicted, when inclement weather 218 is present in region 220 of airspace 222, an aircraft in plurality of aircraft 202 may be unable to receive position information from satellite 204 and/or satellite 206 when the aircraft is in region 220 of airspace 222. In other words, communications are disrupted in region 220 of airspace 222. This type of condition may be input into simulation 102 as threat 132 in FIG. 1.

Additionally, threat 224 may also be present in this illustrative example. Threat 224 is another example of a condition that may be input into simulation 102 as threat 132 in FIG. 1. Threat 224 may take a number of different forms in aircraft environment 200. For example, threat 224 may take the form of a compromised node, such as a compromised aircraft or compromised ground station. A compromised node is a spoofed node or a physical node that is controlled by an unauthorized entity.

A compromised node is a node that does not operate or act as desired or expected. For example, the comprised node may be one that has been unintentionally or intentionally altered.

In some cases, threat 224 may be a ground or aerial device that sends false information to ground stations 212 and/or to plurality of aircraft 202. In some cases, threat 224 may be a jamming device that prevents information from being sent to and/or received at one or more of ground stations 212 and/or plurality of aircraft 202. For example, when threat 224 is a jamming device, communications between aircraft in plurality of aircraft 202 and/or between aircraft and one or more of ground stations 212 may be disrupted.

Figure 3:
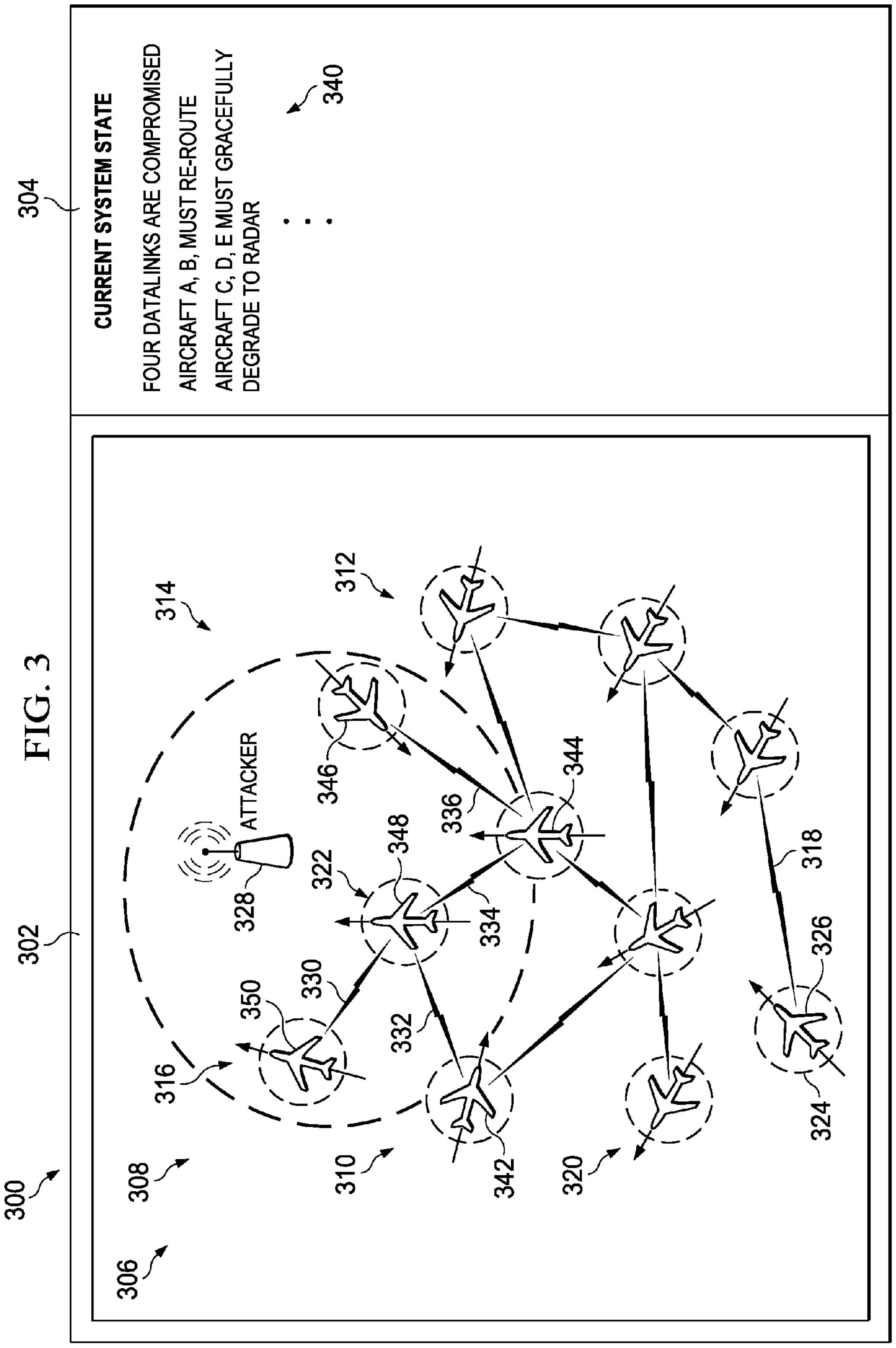
FIG. 3 is an illustration of one type of display of a simulation of an aircraft environment in accordance with an advantageous embodiment.

With reference now to FIG. 3, an illustration of a display of a simulation of an aircraft environment is depicted in accordance with an advantageous embodiment. In this illustrative example, display 300 is an example of one implementation for display 154 in FIG. 1. As depicted, display 300 includes section 302 and section 304.

In this illustrative example, section 302 in display 300 is a graphical representation of simulation 306 of aircraft environment 308. Section 302 may be displayed while simulation 306 is running.

In particular, plurality of aircraft 310 and traffic flow 314 for plurality of aircraft 310 are shown in section 302. In this example, plurality of aircraft 310 form aircraft communications network 312 in aircraft environment 308.

As depicted, plurality of aircraft 310 is nodes 316 having certain positions within aircraft communications network 312. Further, communications links 318 are present between nodes 316 allowing aircraft communications.

As depicted, arrows 320 indicate directions of movement for plurality of aircraft 310. This movement represents traffic flow 314.

Further, circles 322 associated with plurality of aircraft 310 indicate safety zones for plurality of aircraft 310. For example, each circle in circles 322 is proportional to a distance that should be maintained between the corresponding aircraft in the circle and other aircraft. For example, circle 324 indicates a minimum distance from aircraft 326 that should be maintained by other aircraft. This distance represents a safety zone for aircraft 326.

Further, in this illustrative example, threat 328 has been introduced into simulation 306 of aircraft environment 308. As depicted, threat 328 has an effect on communications links 330, 332, 334, and 336 in communications links 318.

In this illustrative example, section 304 contains current status 340 for aircraft communications in aircraft communications network 312 and traffic flow 314 of plurality of aircraft 310. As depicted, current status 340 indicates that four communications links have been disrupted. Current status 340 also indicates that aircraft 342 and aircraft 344 in plurality of aircraft 310 are to be rerouted by the air traffic management system managing traffic flow 314.

Still further, current status 340 indicates that aircraft 346, aircraft 348, and aircraft 350 need to begin using radar systems for identifying and transmitting position information, instead of a global positioning system.

Figure 4:
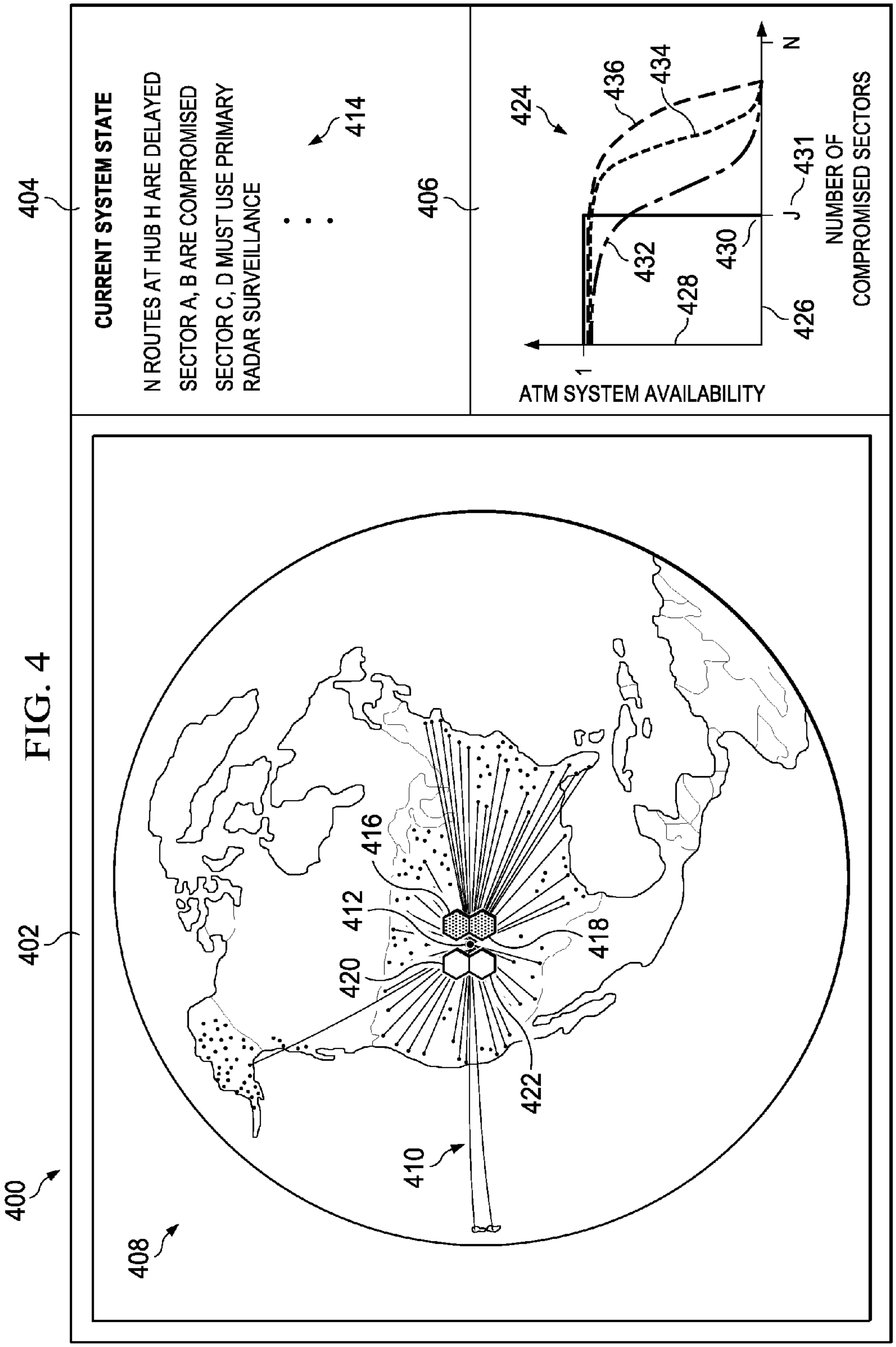
FIG. 4 is an illustration of another type of display of a simulation of an aircraft environment in accordance with an advantageous embodiment.

With reference now to FIG. 4, an illustration of another display of a simulation of an aircraft environment is depicted in accordance with an advantageous embodiment. In this illustrative example, display 400 is an example of one implementation for display 154 in FIG. 1. As depicted, display 400 includes section 402, section 404, and section 406.

In this illustrative example, section 402 has map 408 and flight paths 410 for different aircraft across the United States in response to a threat at airport hub 412.

Section 404 includes current status 414 for aircraft communications and traffic flow based on flight paths 410. Current status 414 indicates that a number of flight paths from airport hub 412 have been delayed. Further, current status 414 indicates that airspace sector 416 and airspace sector 418 have been compromised. In other words, communications within these sectors have been compromised or disrupted. Current status 414 also indicates that aircraft within airspace sector 420 and airspace sector 422 need to use radar systems for identifying position information instead of a global positioning system.

In this illustrative example, section 406 includes graph 424. Graph 424 has horizontal axis 426 and vertical axis 428. Horizontal axis 426 is the number of compromised airspace sectors. Vertical axis 428 is the availability of the air traffic management system managing traffic flow of the aircraft.

This availability of the air traffic management system is based on the ability of the air traffic management system to receive information from aircraft within the different airspace sectors and monitor traffic flow using that information. As graph 424 indicates, as the number of compromised airspace sectors increases, the availability of the air traffic management system decreases.

Curve 430 shows a sudden transition from a completely available to a completely unavailable air traffic management system when the number of compromised sectors reaches threshold 431. Curve 430 represents the most undesirable performance for the air traffic management system. Curves 432, 434, and 436 show smoother transitions in the availability of the air traffic management system in the presence of an increasing number of compromised sectors. As depicted, curve 436 represents the most desirable performance for the air traffic management system.

Figure 5:
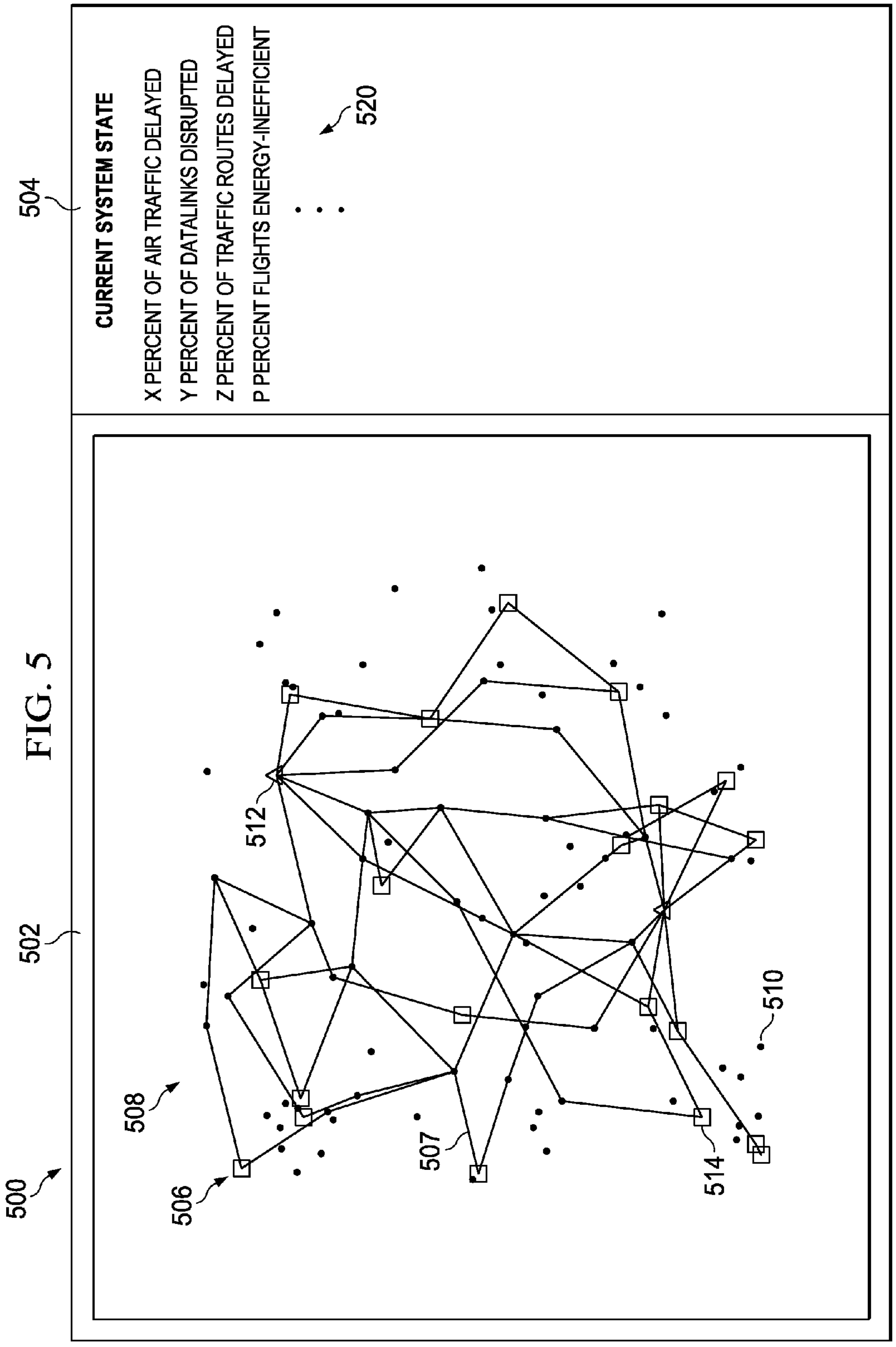
FIG. 5 is an illustration of yet another type of display of a simulation of an aircraft environment in accordance with an advantageous embodiment.

With reference now to FIG. 5, an illustration of yet another display of a simulation of an aircraft environment is depicted in accordance with an advantageous embodiment. In this illustrative example, display 500 is an example of one implementation for display 154 in FIG. 1. As depicted, display 500 includes section 502 and section 504.

In this illustrative example, section 502 includes nodes 506 and communications links 507 in aircraft communications network 508. Nodes 506 include ground stations 510, aircraft 512, and compromised nodes 514. Compromised nodes 514 may be, for example, ground stations and/or aircraft that have had their communications disrupted or are under the control of unauthorized entities. Communications links 507 from compromised nodes 514 may contain false information or other types of threats that affect aircraft communications network 508.

As depicted, section 504 has current status 520 in response to disrupted links and the presence of compromised nodes. Current status 520 indicates the percentage of air traffic that has been delayed, the percentage of communications links that have been disrupted, the percentage of flight paths that have been delayed, and the percentage of flight plans that are using an undesired amount of energy.

Figure 6:
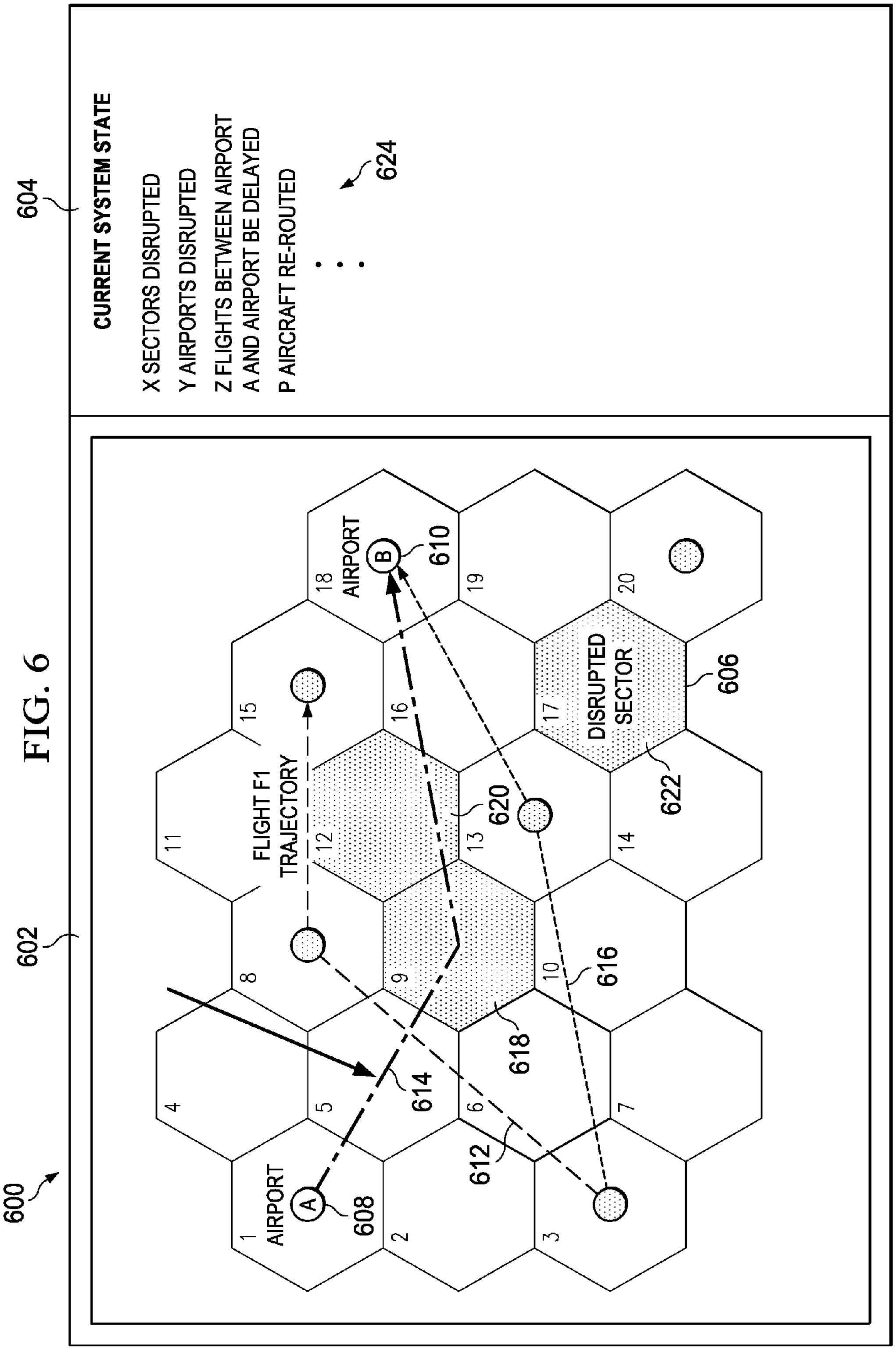
FIG. 6 is an illustration of one type of display of a simulation of an aircraft environment in accordance with an advantageous embodiment.

With reference now to FIG. 6, an illustration of one type of display of a simulation of an aircraft environment is depicted in accordance with an advantageous embodiment. In this illustrative example, display 600 is an example of one implementation for display 154 in FIG. 1. As depicted, display 600 includes section 602 and section 604.

In this illustrative example, airspace sectors 606, airport 608, airport 610, flight path 612, original flight path 614, and new flight path 616 are in section 602. Communications within airspace sector 618, airspace sector 620, and airspace sector 622 have been disrupted in this illustrative example. Further, communications at airport 610 have been disrupted.

Flights along flight path 612 from airport 608 to airport 610 have been delayed. Further, in response to the presence of disrupted communications in airspace sector 618, airspace sector 620, and airspace sector 622, original flight path 614 has been rerouted to new flight path 616.

As depicted, current status 624 is in section 604. Current status 624 indicates the number of airspace sectors that have been disrupted, the number of airports that have been disrupted, the number of flights that have been delayed between airport 608 and airport 610, and the number of aircraft whose flight paths have been rerouted.

Figure 7:
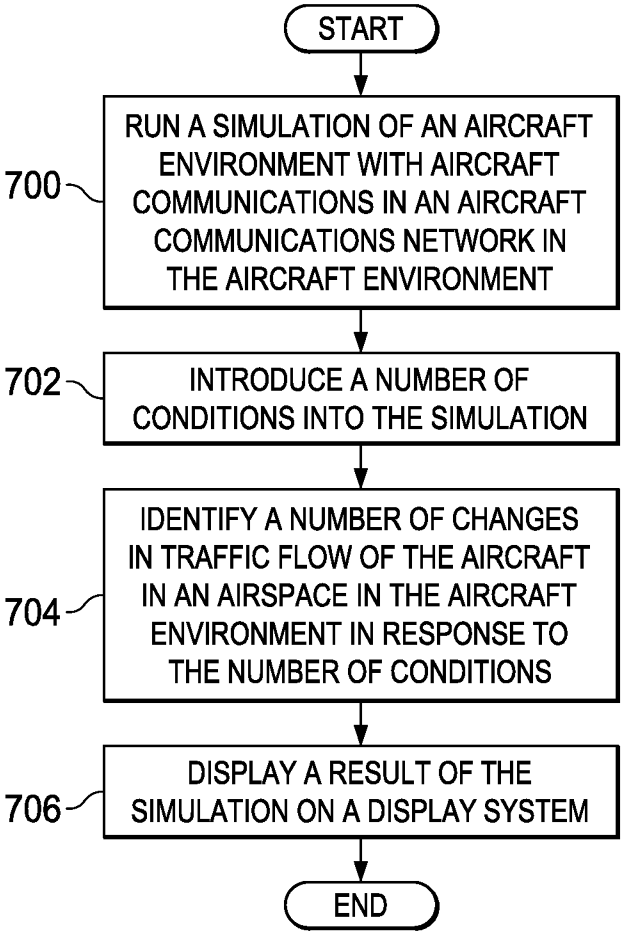
FIG. 7 is an illustration of a flowchart of a process for simulating effects of threats to aircraft communications in accordance with an advantageous embodiment.

With reference now to FIG. 7, an illustration of a flowchart of a process for simulating effects of threats to aircraft communications is depicted in accordance with an advantageous embodiment. The process illustrated in FIG. 7 may be implemented in simulation module 120 in FIG. 1.

The process begins by running a simulation of an aircraft environment with aircraft communications in an aircraft communications network in the aircraft environment (operation 700). In operation 700, the simulation simulates management of traffic flow of aircraft in the aircraft environment based on the aircraft communications in the aircraft communications network.

The process then introduces a number of conditions into the simulation (operation 702). In operation 702, the number of conditions may include a number of threats, a number of solutions to reduce the number of threats and/or effects of the number of threats, and/or other suitable conditions. For example, the number of conditions may include an exploit of a vulnerability in an aircraft communications network.

In this illustrative example, a number of conditions may be introduced into the simulation before the simulation is run, while the simulation is running, and/or at other suitable times. Further, the different conditions may be introduced into the simulation at different times.

The process then identifies a number of changes in traffic flow of the aircraft in an airspace in the aircraft environment in response to the number of conditions (operation 704). The number of changes may include, for example, without limitation, delays in flight plans, rerouting of flight paths, cancelled flights, and/or other types of changes.

Thereafter, the process displays a result of the simulation on a display system (operation 706), with the process terminating thereafter.

Figure 8:
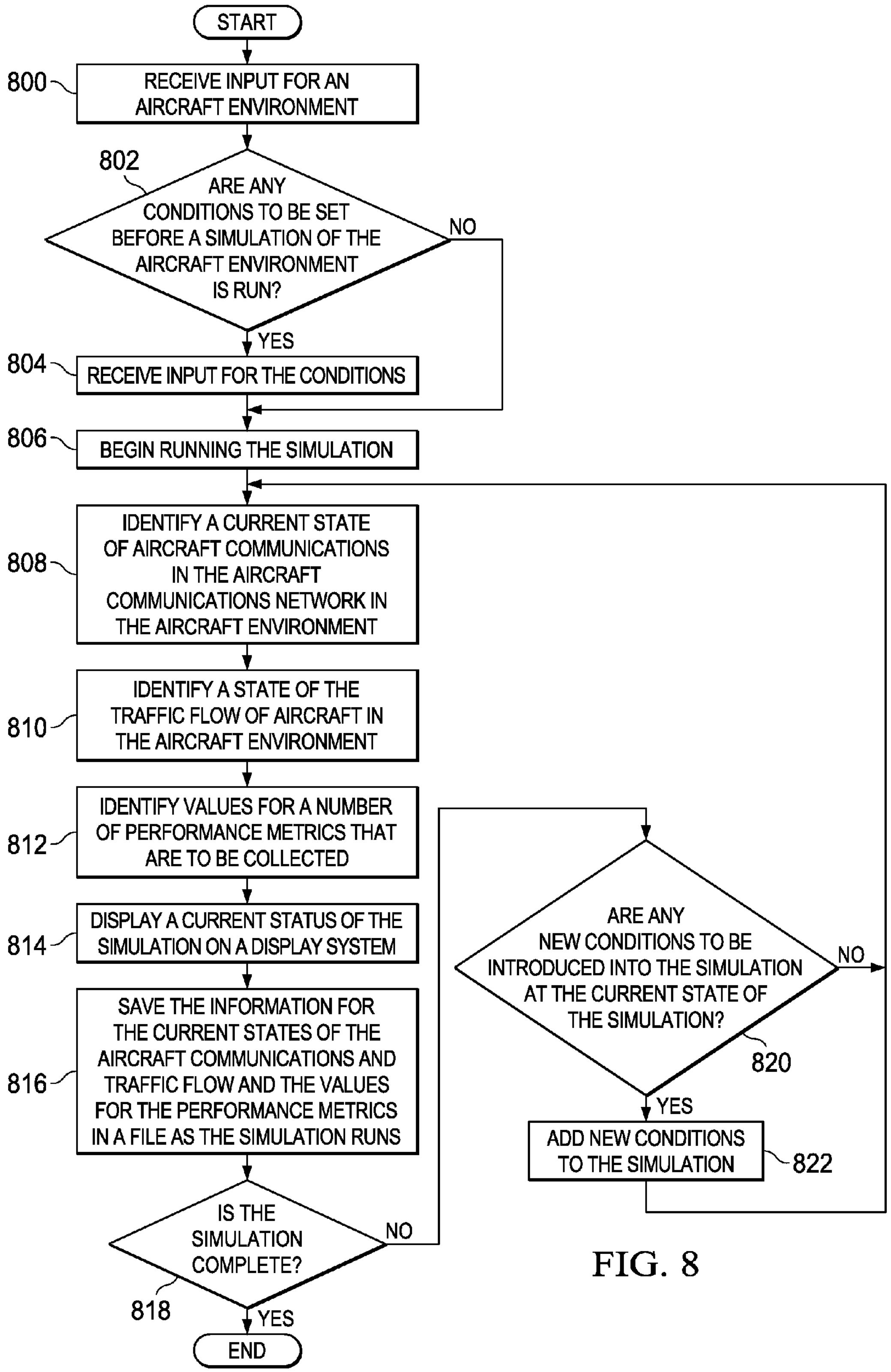
FIG. 8 is an illustration of a flowchart of a process for simulating effects of threats on aircraft communications in accordance with an advantageous embodiment.

Turning now to FIG. 8, an illustration of a flowchart of a process for simulating effects of threats on aircraft communications is depicted in accordance with an advantageous embodiment. The process illustrated in FIG. 8 may be implemented using simulation module 120 in FIG. 1. This process is a more-detailed process of the process described in FIG. 7.

The process begins by receiving input for an aircraft environment (operation 800). In operation 800, this input may be, for example, a selection of an aircraft environment from a list of predefined aircraft environments. The aircraft environment is an environment in which aircraft communications are present in an aircraft communications network.

In some illustrative examples, this input may be, for example, without limitation, at least one of geography, a number of airports, flight paths, a number of aircraft, a region of airspace, air traffic control rules, a safety zone for aircraft, criteria for transitioning from using information provided by a global positioning system to information provided by a radar system, aircraft noise and emissions specifications, ground infrastructure parameters, radar coverage parameters, parameters for communications links, fuel cost, and other suitable types of input.

In operation 800, the input may be user input received from an operator of simulation module 120 in FIG. 1, input retrieved from a data structure, or some other suitable type of input. The data structure may be, for example, a database, a file, and/or some other suitable type of data structure.

The process determines whether any conditions are to be set before a simulation of the aircraft environment is run (operation 802). This determination may be made based on, for example, preset parameters for the simulation and/or user input indicating that the conditions are to be set before the simulation is run. If conditions are not to be set before the simulation is run, the process proceeds to operation 806.

If conditions are to be set before the simulation is run, the process receives input for the conditions (operation 804). In operation 804, this input may include, for example, without limitation, at least one of an identification of a threat, parameters for the threat, a time period for how long the threat is present in the aircraft environment, a number of locations at which a number of threats may be present, an identification of a number of nodes in the aircraft communications network that are compromised, and/or other suitable types of input.

In some illustrative examples, the input in operation 804 may also include, for example, without limitation, at least one of an identification of a solution to a threat, a time at which the solution is to be implemented, parameters for the solution to be implemented, and other suitable types of input.

The process then begins running the simulation (operation 806). This simulation is a simulation of how an air traffic management system manages traffic flow of the aircraft in an airspace in the aircraft environment. Thereafter, the process identifies a current state of aircraft communications in the aircraft communications network in the aircraft environment (operation 808). The process also identifies a state of the traffic flow of aircraft in the aircraft environment (operation 810).

Next, the process identifies values for a number of performance metrics that are to be collected (operation 812). These performance metrics may include measurements for different parameters for the traffic flow. In some cases, these performance metrics may also include measurements for different parameters for the air traffic management system. These parameters may be for assessing the management of the traffic flow of the aircraft by the air traffic management system.

The process then displays a current status of the simulation on a display system (operation 814). The process then saves the information for the current states of the aircraft communications and traffic flow and the values for the performance metrics in a file as the simulation runs (operation 816). Next, the process determines whether the simulation is complete (operation 818). If the simulation is complete, the process terminates.

Otherwise, if the simulation is not complete, the process determines whether any new conditions are to be introduced into the simulation at the current state of the simulation (operation 820). For example, new conditions may be introduced for a number of different reasons. For example, a new condition may be introduced when the simulation has run for a particular amount of time, when an event occurs in the traffic flow, and/or for some other suitable reason.

If new conditions are to be introduced, the process adds the new conditions to the simulation (operation 822) and returns to operation 808 as described above. Otherwise, if new conditions are not to be introduced, the process returns to operation 808 as described above.

In this illustrative example, operations 808, 810, and 812 are performed repeatedly such that changes in the current state of the aircraft communications, changes in the current state of traffic flow, and/or changes in the values for the performance metrics may change the display of the current state of the simulation. In other words, the display of the current state of the simulation may change while the simulation runs.

Furthermore, in some cases, the current state of the traffic flow may only change in response to changes in the current state of the aircraft communications.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, in some illustrative examples, operation 814 may be performed continuously such that changes to the current state of the aircraft communications identified in operation 808 and changes to the current state of the traffic flow identified in operation 810 are represented in the display on the display system.

Figure 9:
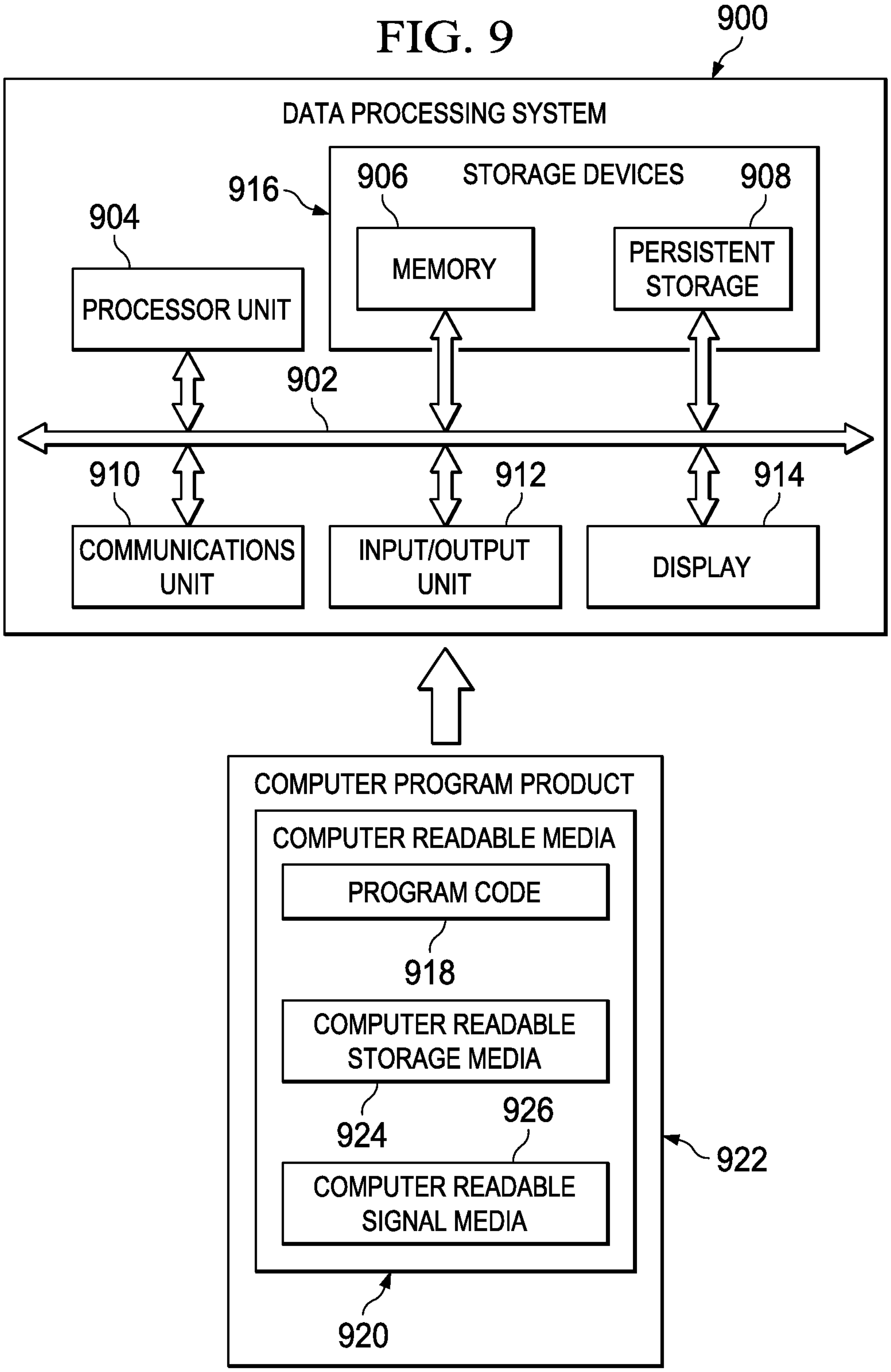
FIG. 9 is an illustration of a data processing system in accordance with an advantageous embodiment.

Turning now to FIG. 9, an illustration of a data processing system is depicted in accordance with an advantageous embodiment. In this illustrative example, data processing system 900 includes communications fabric 902, which provides communications between processor unit 904, memory 906, persistent storage 908, communications unit 910, input/output (I/O) unit 912, and display 914. Data processing system 900 may be computer system 122 or number of computers 124 running in simulation environment 100 in FIG. 1. Simulation module 120 in FIG. 1 may be implemented in or used in data processing system 900.

Processor unit 904 serves to execute instructions for software that may be loaded into memory 906. Processor unit 904 may be a number of processors, a multi-processor core, or some other type of processor, depending on the particular implementation. A "number", as used herein with reference to an item, means "one or more items." Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for execution by processor unit 904. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926. Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900.

In some instances, computer readable storage media 924 may not be removable from data processing system 900. In these examples, computer readable storage media 924 is a physical or tangible storage device used to store program code 918 rather than a medium that propagates or transmits program code 918. Computer readable storage media 924 is also referred to as a computer readable tangible storage device or a computer readable physical storage device. In other words, computer readable storage media 924 is a media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different advantageous embodiments may be implemented in a data processing system including components in addition to or in place of those illustrated for data processing system 900. Other components shown in FIG. 9 can be varied from the illustrative examples shown. The different advantageous embodiments may be implemented using any hardware device or system capable of running program code. In one illustrative example, data processing system 900 may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 906, or a cache, such as found in an interface and memory controller hub that may be present in communications fabric 902.

Thus, the different advantageous embodiments provide a method and apparatus for simulating effects of threats to aircraft communications. In one advantageous embodiment, a simulation of an aircraft environment is run with the aircraft communications in an aircraft communications network in the aircraft environment. A number of conditions is introduced. The number of conditions comprises a threat configured to affect the aircraft communications in the aircraft communications network in an undesired manner. A change in traffic flow of aircraft in an airspace in the aircraft environment is identified in response to the number of conditions.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for simulating effects of threats to aircraft communications, the method comprising:

running, on a computer, a simulation of an aircraft environment with the aircraft communications in an aircraft communications network in the aircraft environment;

introducing into the simulation a number of conditions, wherein the number of conditions comprises a threat configured to affect the aircraft communications in the aircraft communications network in an undesired manner;

identifying, by the computer, a change in the aircraft communications in the simulation in response to the number of conditions; and identifying, by the computer, a change in traffic flow of aircraft in an airspace in the aircraft environment in response to the change in the aircraft communications.

2. The method of claim 1, wherein the step of introducing into the simulation the number of conditions comprises introducing the number of conditions at a number of different times during the simulation.

3. The method of claim 1, wherein the number of conditions further comprises a number of solutions for reducing at least one of the threat and the effects of the threat to aircraft communications in the aircraft communications network.

4. The method of claim 3 further comprising:

determining, by the computer, whether the number of solutions reduces the threat by a desired amount.

5. The method of claim 1, wherein the threat is selected from one of a solar flare, a virus on a computer system in the aircraft communications network, a first device in the aircraft communications network in which the first device is configured to intentionally disrupt the aircraft communications in the aircraft communications network, and a second device in the aircraft communications network configured to introduce false information into the aircraft communications network.

6. The method of claim 1, wherein the number of conditions further includes a number of threats in addition to the threat.

7. The method of claim 1 further comprising:

displaying, by the computer, the traffic flow of the aircraft with any changes to the traffic flow caused by the change in the aircraft communications on a display system.

8. The method of claim 7, wherein displaying the traffic flow of the aircraft comprises displaying at least one of nodes in the aircraft communications network, communications links between the nodes, flight paths, the aircraft, planned flights, a number of airports, airspace sectors, changes to the communications links, changes to the flight paths, and air traffic management infrastructures.

9. A method for simulating communications disruptions in an aircraft environment, the method comprising:

running, on a computer, a simulation of the aircraft environment;

introducing input conditions to the simulation comprising at least one threat and at least one solution to reduce at least one of the at least one threat and effects of the at least one threat;

identifying, by the computer, changes to a number of performance metrics caused by the input conditions;

identifying, by the computer, a change in communications between aircraft in the simulation in response to the input conditions;

identifying, by the computer, a change in movement of the aircraft in an airspace in the aircraft environment in response to the change in communications between the aircraft; and displaying, by the computer, a result of the at least one threat and the at least one solution in the simulation with respect to the movement of the aircraft in the airspace in the aircraft environment on a display system.

10. The method of claim 9, wherein the input conditions comprise at least one of a cyber-physical system, a vulnerability exploit, a vulnerability mitigation, and a system response to the vulnerability exploit.

11. The method of claim 10, wherein the vulnerability mitigation further comprises at least one of a rerouting of the aircraft, a rescheduling of take-offs and landings for at least one airport, and relying on radar more than a global positioning system.

12. The method of claim 9, wherein displaying the result of the at least one threat and the at least one solution in the simulation with respect to the movement of the aircraft in the airspace in the aircraft environment on the display system comprises:

displaying at least one of a plurality of aircraft, a plurality of planned flights, a plurality of airports, a plurality of airspace sectors, and a plurality of ground air traffic management (ATM) infrastructures with the result that indicates an effect on the movement of the aircraft in the airspace in the aircraft environment on the display system.

13. The method of claim 9, wherein the number of performance metrics comprises at least one of a number of air sectors disrupted, a number of airports disrupted, a number of flights delayed, and a number of aircraft rerouted.

14. The method of claim 9 further comprising:

identifying, by the computer, a number of components in the aircraft environment affected by the input conditions, wherein the number of components comprises at least one of an individual aircraft out of said aircraft, the airspace, an airport, and a communications network.

15. The method of claim 9, wherein the threat is selected from one of a solar flare, a virus on a computer system in an aircraft communications network in the aircraft environment, a first device in the aircraft communications network in which the first device is configured to intentionally disrupt the aircraft communications in the aircraft communications network, and a second device in the aircraft communications network configured to introduce false information into the aircraft communications network.

16. An apparatus comprising:

a computer system configured to:

run a simulation of an aircraft environment with aircraft communications;

introduce a number of conditions into the simulation, wherein the number of conditions comprises a threat configured to affect the aircraft communications in an aircraft communications network in the aircraft environment in an undesired manner;

identify a change in the aircraft communications in the simulation in response to the number of conditions; and identify a change in traffic flow of aircraft in an airspace in the aircraft environment in response to the change in the aircraft communications.

17. The apparatus of claim 16, wherein the number of conditions further comprises a solution to reduce at least one of the threat and effects of the threat, and wherein the computer system is further configured to introduce the number of conditions at a number of different times during the simulation and to determine whether the solution reduces the threat by a desired amount.

18. The apparatus of claim 16, wherein the threat is selected from one of a solar flare, a virus on a computer system in the aircraft communications network, a first device in the aircraft communications network in which the first device is configured to intentionally disrupt the aircraft communications in the aircraft communications network, and a second device in the aircraft communications network configured to introduce false information into the aircraft communications network.

19. The apparatus of claim 16, wherein the computer system is further configured to display the traffic flow of the aircraft with any changes to the traffic flow caused by the change in the aircraft communications on a display system.

20. The apparatus of claim 19 further comprising:

the display system, wherein the traffic flow of the aircraft with the any changes to the traffic flow caused by the change in the aircraft communications is displayed on the display system with at least one of nodes in the aircraft communications network, communications links between the nodes, flight paths, the aircraft, planned flights, a number of airports, airspace sectors, changes to the communications links, changes to the flight paths, and air traffic management infrastructures.

* * * * *